(12) United States Patent
Meshenky et al.

(10) Patent No.: US 8,671,921 B2
(45) Date of Patent: Mar. 18, 2014

(54) EXHAUST GAS RECIRCULATION SYSTEM AND METHOD OF OPERATING THE SAME

(75) Inventors: Steven P. Meshenky, Racine, WI (US); David Wesley Mast, Burlington, WI (US); Robert Barfknecht, Waterford, WI (US)

(73) Assignee: Modine Manufacturing Company, Racine, WI (US)

( * ) Notice: Subject to any disclaimer, the term of this patent is extended or adjusted under 35 U.S.C. 154(b) by 866 days.

(21) Appl. No.: 12/668,120

(22) PCT Filed: Aug. 1, 2008

(86) PCT No.: PCT/US2008/071870
§ 371 (c)(1),
(2), (4) Date: Sep. 3, 2010

(87) PCT Pub. No.: WO2009/029382
PCT Pub. Date: Mar. 5, 2009

(65) Prior Publication Data
US 2011/0011376 A1 Jan. 20, 2011

Related U.S. Application Data

(60) Provisional application No. 60/969,098, filed on Aug. 30, 2007.

(51) Int. Cl.
*F02M 25/07* (2006.01)
*F02B 47/08* (2006.01)
*F28F 9/02* (2006.01)

(52) U.S. Cl.
USPC ....... 123/568.12; 165/153; 165/173; 165/178

(58) Field of Classification Search
USPC .......... 123/41.31, 568.12; 165/148, 151, 153, 165/157, 158, 172, 173, 176, 177, 178; 60/605.2
See application file for complete search history.

(56) References Cited

U.S. PATENT DOCUMENTS

| | | | | |
|---|---|---|---|---|
| 5,758,721 A | * | 6/1998 | Letrange et al. | 165/173 |
| 5,865,243 A | * | 2/1999 | Kato et al. | 165/153 |
| 7,478,630 B2 | * | 1/2009 | Maucher et al. | 123/568.12 |
| 2004/0182558 A1 | * | 9/2004 | Watanabe et al. | 165/173 |
| 2007/0131392 A1 | * | 6/2007 | Minami et al. | 165/178 |
| 2007/0251682 A1 | * | 11/2007 | Sasaki | 165/153 |
| 2008/0017364 A1 | * | 1/2008 | Ichiyanagi et al. | 165/178 |

FOREIGN PATENT DOCUMENTS

| | | | | |
|---|---|---|---|---|
| JP | 06229696 A | * | 8/1994 | 168/178 |
| KR | 10-2002-85513 A | | 11/2002 | |
| KR | 10-2006-58330 A | | 5/2006 | |
| KR | 10-2006-63807 A | | 6/2006 | |
| KR | 10-2007-25665 A | | 3/2007 | |

OTHER PUBLICATIONS

International Search Report for Application No. PCT/US2008/071870 dated Nov. 13, 2008 (3 pages).
Written Opinion for Application No. PCT/US2008/071870 dated Nov. 13, 2008 (5 pages).

* cited by examiner

*Primary Examiner* — Willis R Wolf, Jr.
(74) *Attorney, Agent, or Firm* — Michael Best & Friedrich LLP

(57) ABSTRACT

The present invention provides an exhaust gas recirculation cooler for transferring heat from engine exhaust to coolant including a pair of spaced apart headers, a tube body extending between the pair of headers and positioned along a flow path for the coolant and at least partially defining a flow path for the engine exhaust along a length of the tube between the pair of headers, and a corrugated insert supported in an interior of the tube and having a height in a direction of a plurality of corrugations and a width between about 8.6 and about 13.5 times the height. The width can be substantially perpendicular to the length of the tube and can be substantially perpendicular to the height of the insert.

25 Claims, 4 Drawing Sheets

EXHAUST GAS RECIRCULATION SYSTEM AND METHOD OF OPERATING THE SAME

CROSS-REFERENCE TO RELATED APPLICATIONS

This patent application claims priority to International Patent Application No. PCT/US2008/071870, filed 1 Aug. 2008, which claims priority to U.S. Provisional Patent Application No. 60/969,098, filed 30 Aug. 2007, each of which is incorporated herein in its entirety. Priority is hereby claimed to each of these applications.

FIELD OF THE INVENTION

The present invention relates to an exhaust gas recirculation system for a vehicle engine.

SUMMARY

In some embodiments, the invention provides an exhaust gas recirculation cooler for transferring heat from engine exhaust to coolant including a pair of spaced apart headers and a tube body extending between the pair of headers and positioned along a flow path for the coolant and at least partially defining a flow path for the engine exhaust along a length of the tube between the pair of headers. The exhaust gas recirculation cooler can also include a corrugated insert supported in an interior of the tube and having a height in a direction of a plurality of corrugations and a width between about 8.6 and about 13.5 times the height. The width can be substantially perpendicular to the length of the tube and substantially perpendicular to the height of the insert.

The present invention also provides an exhaust gas recirculation cooler including a pair of spaced apart headers and a tube body extending between the pair of headers and positioned along a flow path for the coolant and at least partially defining a flow path for the engine exhaust along a length of the tube between the pair of headers. The tube body can include a pair of spaced apart arcuate ends and a side wall extending between the pair of arcuate ends and having a width. A corrugated insert can be supported in an interior of the tube and can have a width in a direction substantially perpendicular to a plurality of corrugations and substantially perpendicular to the length of the tube, which can be no less than 0.96 times and no greater than 1.00 times the width of the side wall.

In addition, the present invention provides an exhaust gas recirculation cooler including a pair of spaced apart headers, a tube body extending between the pair of headers and positioned along a flow path for the coolant and at least partially defining a flow path for the engine exhaust along a length of the tube between the pair of headers. The tube body can include a pair of parallel side walls and a pair of spaced apart arcuate ends extending between the pair of spaced apart side walls. A width between the arcuate ends can be no more than 1.12 times a width of one of the pair of spaced apart side walls. The exhaust gas recirculation cooler can also include a corrugated insert supported in an interior of the tube and having opposite ends stopping short of the arcuate ends of the tube.

In some embodiments, the present invention provides an exhaust gas recirculation cooler including a pair of spaced apart headers and a tube body extending between the pair of headers and positioned along a flow path for the coolant and at least partially defining a flow path for the engine exhaust along a length of the tube between the pair of headers. The tube body can include a pair of parallel side walls and a pair of spaced apart arcuate ends extending between the pair of spaced apart side walls. The exhaust gas recirculation cooler can also include a corrugated insert supported in an interior of the tube and having a width in a direction substantially perpendicular to a plurality of corrugations and substantially perpendicular to the length of the tube. The width of the insert can be greater than 0.90 times a width of the tube between the pair of arcuate ends.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," and the like) are only used to simplify description of the present invention, and do not alone indicate or imply that the device or element referred to must have a particular orientation. In addition, terms such as "first" and "second" are used herein for purposes of description and are not intended to indicate or imply relative importance or significance.

FIGS. 1-4 illustrate a heat exchanger 10 according to some embodiments of the present invention. In some embodiments, including the illustrated embodiment of FIGS. 1-4, the heat exchanger 10 can operate as an exhaust gas recirculation cooler (EGRC) and can be operated as part of the exhaust system and/or the emission system of a vehicle. During operation and as explained in greater detail below, the heat exchanger 10 can transfer heat from a high temperature first working fluid (e.g., exhaust gas, engine coolant, $CO_2$, an organic refrigerant, and the like) to a lower temperature second working fluid (e.g., water, engine coolant, $CO_2$, an organic refrigerant, R12, R245fa, R22, R410A, air, and the like).

Figure 3:
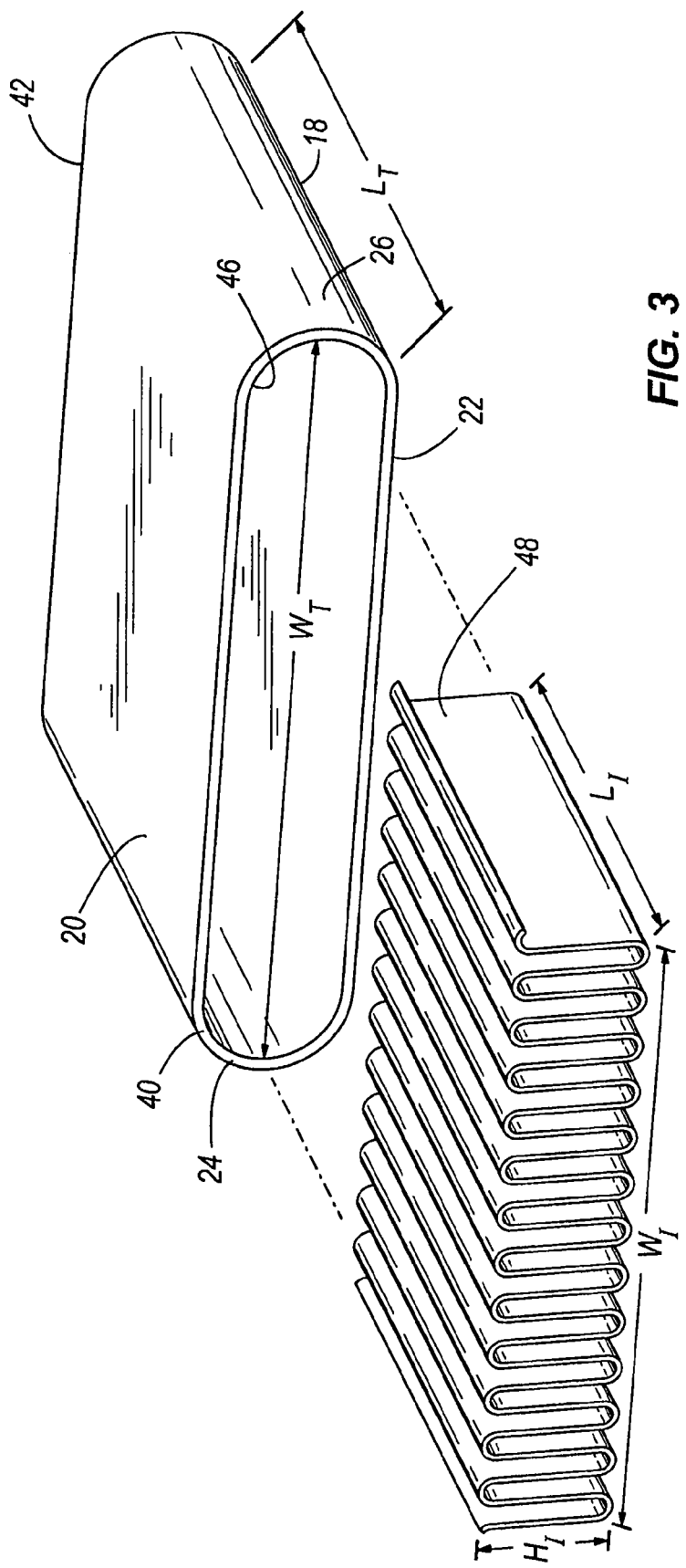
FIG. 3 is an exploded view of a portion of a tube and an insert of the heat exchanger shown in FIG. 1.
Figure 4:
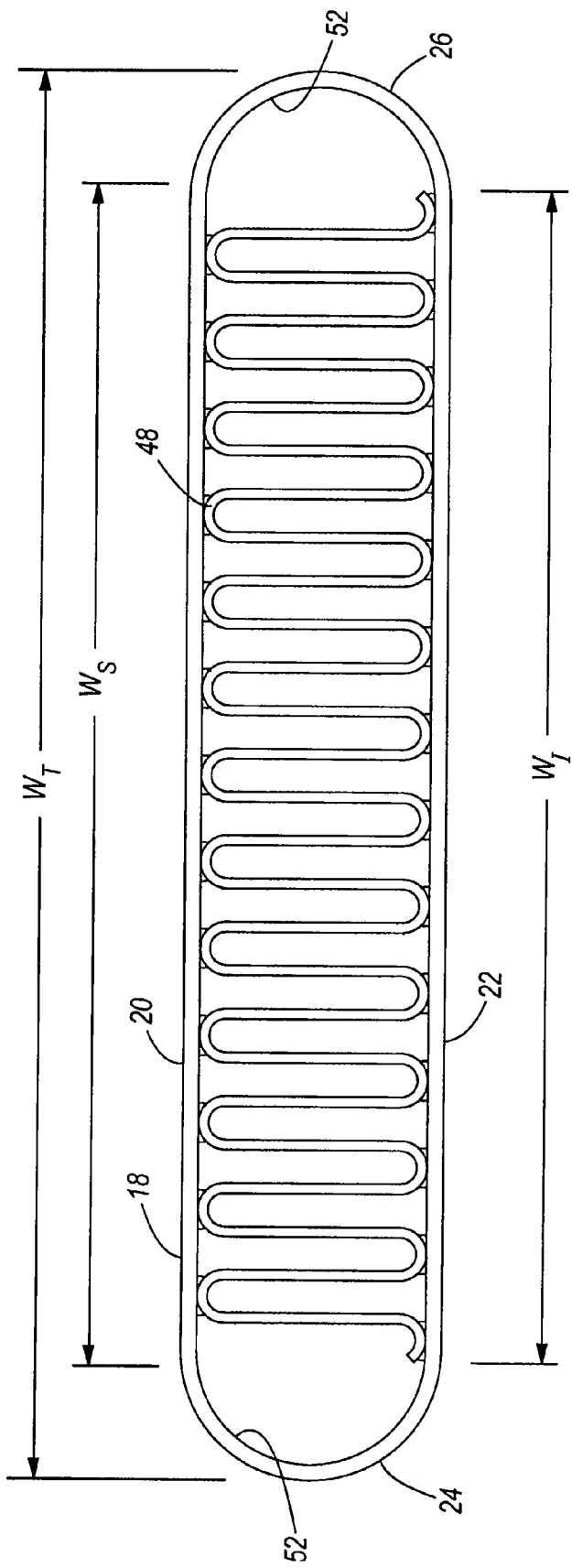
FIG. 4 is an enlarged end view of the tube and the insert shown in FIG. 3.

The heat exchanger 10 can include a housing 12 which can extend along a portion of the length of the heat exchanger 10 and can at least partially enclose a heat exchanger core 14. In the illustrated embodiment of FIGS. 1 and 2, the heat exchanger core 14 includes seven flat tubes 18 supported in the housing 12. In the illustrated embodiment of FIGS. 1-4, each of the tubes 18 has an elongated cross-sectional shape with two generally parallel sides 20, 22 and two arcuate ends 24, 26 extending between the sides 20, 22. In other embodiments, the heat exchanger 10 can include one, two, three, four, five, six, eight, or more tubes 18, each of which can have a circular, oval, or irregular cross-sectional shape. As shown in FIGS. 3 and 4, each of the tubes 18 can have a width $W_T$ defined between the arcuate ends 24, 26. As also shown in FIG. 4, each of the sides 20, 22 can have a width $W_S$.

Figure 2:
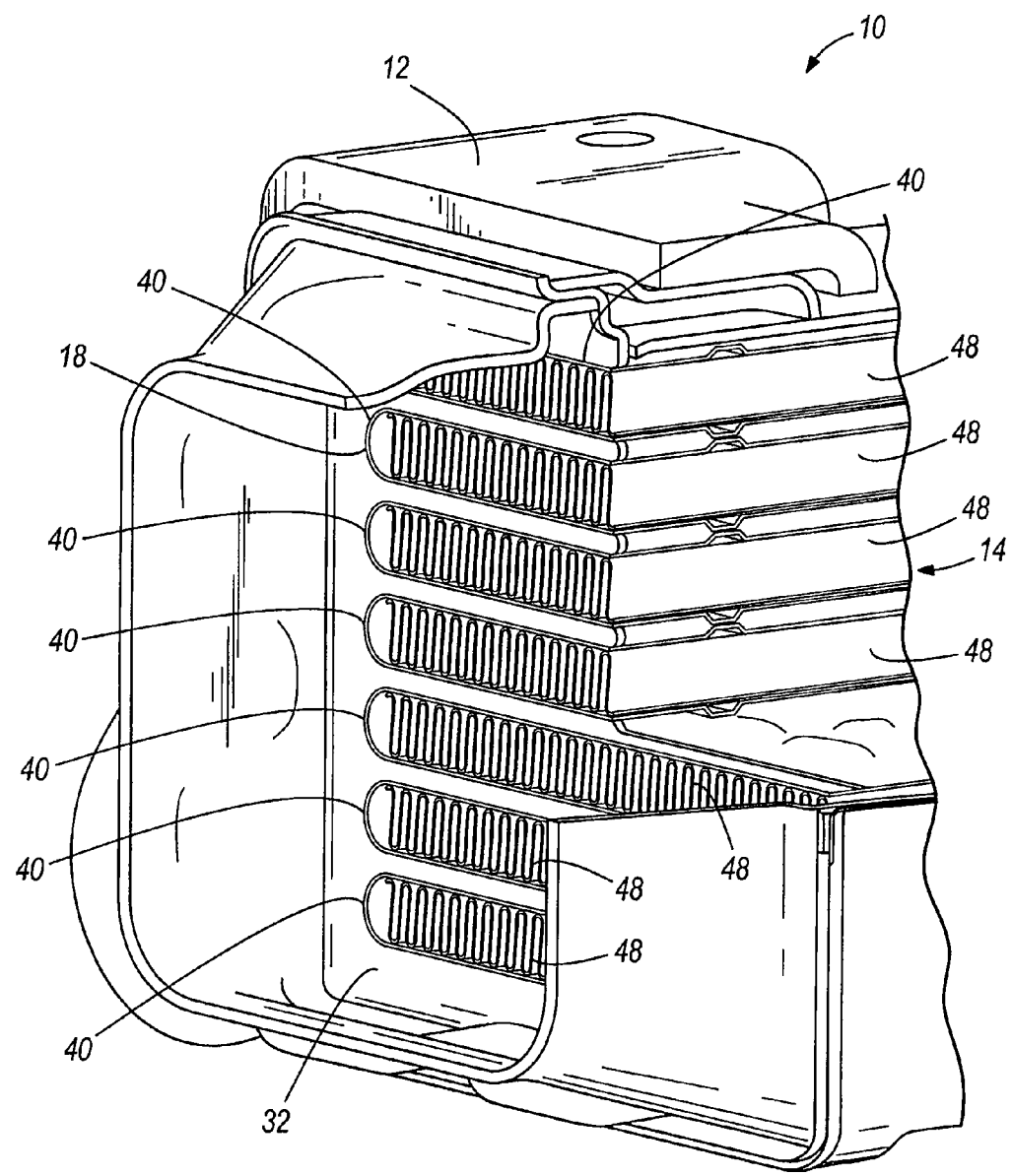
FIG. 2 is a partially cut-away view of a portion of the heat exchanger shown in FIG. 1.

As shown in FIG. 2, the heat exchanger 10 can include headers 32 positioned at opposite ends of the heat exchanger stack 14 and secured to one or more of the tubes 18. In other embodiments, the heat exchanger 10 can include a single header 32 which can be located at either of the ends of the heat exchanger stack 14 or at other locations on the heat exchanger 10.

Figure 1:
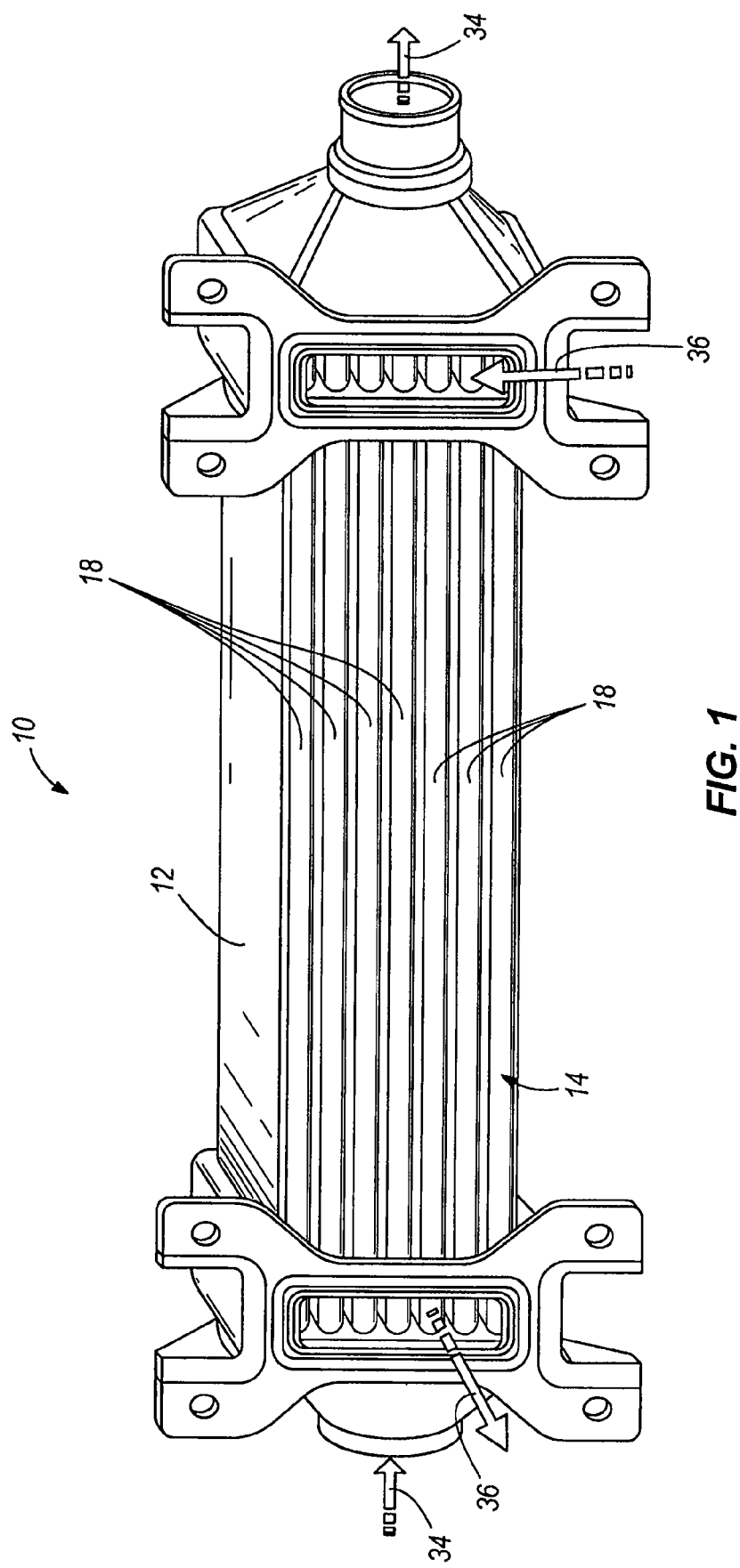
FIG. 1 is a perspective view of a heat exchanger according to some embodiments of the present invention.

As shown in FIGS. 1 and 2, each of the tubes 18 can be connected to the header 32 such that a first working fluid flowing through the heat exchanger 10 is maintained separate from a second working fluid flowing through the heat exchanger 10. More specifically, the heat exchanger 10 defines a first flow path (represented by arrows 34 in FIG. 1) for the first working fluid and a second flow path (represented by arrows 36 in FIG. 1) for a second working fluid.

In some embodiments, such as the illustrated embodiment of FIGS. 1 and 2, the tubes 18 can be arranged in a stacking direction and can be connected to the header 14 allowing the first working fluid to travel along the first flow path 34, into the open inlet ends 40 of the tubes 18, through a length $L_T$ of the tubes 18 between the inlet and outlet ends 40, 42 of the tubes 18, and out of the tubes 18 through the outlet ends 42. In some embodiments, the second working fluid travels along the second flow path 36 and across an exterior of the tubes 18.

In the illustrated embodiment of FIG. 1, the heat exchanger 10 is configured as a parallel-flow heat exchanger such that the first flow path 34 or a portion of the first flow path 34 is substantially parallel to the second flow path 36 or a portion of the second flow path 36. In other embodiments, the heat exchanger 10 can have other configurations and arrangements, such as, for example, a cross-flow or a counter-flow configuration.

In the illustrated embodiment of FIG. 1, the heat exchanger 10 is configured as a single-pass heat exchanger with the first working fluid traveling along the first flow path 34 through at least one of a number of tubes 18 and with the second working fluid traveling along the second flow path 36 between adjacent tubes 18. In other embodiments, the heat exchanger 10 can be configured as a multi-pass heat exchanger with the first working fluid traveling in a first pass through one or more of the tubes 18 and then traveling in a second pass through one or more different tubes 18 in a direction opposite to the flow direction of the first working fluid in the first pass. In these embodiments, the second working fluid can travel along the second flow path 36 between adjacent tubes 18.

In yet other embodiments, the heat exchanger 10 can be configured as a multi-pass heat exchanger with the second working fluid traveling in a first pass between a first pair of adjacent tubes 18 and then traveling in a second pass between another pair of adjacent tubes 18 in a direction opposite to the flow direction of the second working fluid in the first pass. In these embodiments, the first working fluid can travel along the first flow path 34 through at least one of the tubes 18.

As shown in FIGS. 2-4, the heat exchanger 10 can include inserts 48 to improve heat transfer between the first and second working fluids as the first and second working fluids travel along the first and second flow paths 34, 36, respectively. As shown in FIGS. 2-4, the inserts 48 can be formed separately from and positioned within the tubes 18. In other embodiments, inserts 18 can be integrally formed with the tubes 18 and can extend inwardly from inner surfaces 46 of the tubes 18.

In the illustrated embodiment of FIGS. 2-4, an insert 48 is supported in each of the tubes 18, and extends along the entire length $L_T$ or substantially the entire length $L_T$ of each of the tubes 18 between opposite inlet and outlet 40, 42 ends of the tubes 18. As also shown in FIG. 1, the insert 48 can be positioned between the sides 20, 22 of the tube 18 supporting the insert 48 and can have opposite ends, which stop short of the arcuate ends 24, 26 of the tube 18. In other embodiments, an insert 48 can be supported in only one or less than all of the tubes 18, and the insert(s) 48 can extend substantially the entire length $L_T$ of the tube(s) 18 between opposite inlet and outlet ends 40, 42 of the tube(s) 18, or alternatively, the insert 48 can extend through the tube(s) 18 along substantially less than the entire length $L_T$ of the tube(s) 18.

In some embodiments, the inserts 48 can be secured to the tubes 18. In some such embodiments, the inserts 48 are soldered, brazed, or welded to the tubes 18. In other embodiments, the inserts 48 can be connected to the tubes 18 in another manner, such as, for example, by an interference fit, adhesive or cohesive bonding material, fasteners, etc.

In some embodiments, the ends of the tubes 18 can be press-fit into a header 32. In some such embodiments, the ends of the tubes 18 and the inserts 48 supported in the tubes 18 or between the tubes 18 can be at least partially deformed when the tubes 18 and/or the inserts 48 are press-fit into the header 14. In some such embodiments, the tubes 18 and/or the inserts 48 are pinched and maintained in compression to secure the tubes 18 and/or the inserts 48 in a desired orientation and to prevent leaking.

In the illustrated embodiment of FIGS. 2-4, the inserts 48 are formed from folded or corrugated sheets of metal. In other embodiments, the inserts 48 can be cast or molded in a desired shape and can be formed from other materials (e.g., aluminum, iron, and other metals, composite material, and the like). In still other embodiments, the inserts 48 can be cut or machined to shape in any manner, can be extruded or pressed, can be manufactured in any combination of such operations, and the like.

As shown in FIGS. 3 and 4, each of the inserts 48 can have a height $H_I$ in the direction of the corrugations, a length $L_I$ between the headers 32, and a width $W_I$ between opposite sides and perpendicular to both the length $L_I$ and the height $H_I$. In some embodiments, a pair of bypasses 52 (see FIG. 4) can extend through each of the tubes 18 between the arcuate ends 24, 26 of the tube 18 and the ends of the insert 48.

Heat transfer between the first working fluid traveling across the insert 48 in each tube 18 and the second working fluid traveling across the tube 18 has been found to be significantly greater than the heat transfer between the first working fluid traveling through the bypasses 52 of the tubes 18 and the second working fluid traveling across the tubes 18.

In some embodiments, such as the embodiments of Examples 1-5 shown below, the tubes 18 and the inserts 48 can be configured to significantly improve heat transfer between the first and second working fluids by decreasing the size of the bypasses 52 as a percentage of the total cross-sectional area of each tube 18, thereby minimizing the negative heat transfer affects of the bypasses 52. Also, in the embodiments listed below, each of the inserts 48 have consistently sized corrugations (i.e., the corrugations at the ends of the inserts 48 have the same size as the corrugations at the centers of the inserts 48).

To improve heat transfer efficiency, the inserts 48 and the tubes 18 can be configured to minimize the cross-sectional area of the bypasses 52 as a percentage of the total cross-sectional area of each of the tubes 18, without significantly and undesirably increasing the overall size of each tube 18. It can be particularly important to minimize the space required within a vehicle engine for a heat exchanger having such tubes 18. The inserts 48 and the tubes 18 can also or alternatively be constructed so as to maximize the surface area of the inserts 48. More particularly, the tubes 18 can be constructed to maximize the width $W_S$ of the tube sides 20, 22 and/or to increase the ratio of the width $W_S$ of the tube sides 20, 22 to the tube width $W_T$. Alternatively or in addition, the tubes 18 and/or the inserts 48 can be constructed and sized so as to generate turbulence along the first flow path 34 and/or the second flow path 36. In some embodiments, the tubes 18 and the inserts 48 can be constructed so as to minimize the height $H_T$ of the tubes 18 and the height $H_I$ of the inserts 48 and to maximize an exterior surface area of the tubes 18 and/or the inserts 48.

Inserts 48 having a width $W_I$ of between 8.6 and 13.5 times the height $H_I$ of the insert 48 have been found to be highly advantageous. Inserts 48 having a width $W_I$ of at least 7.0 times the height $H_I$ of the insert 48 have been found to be more highly advantageous. Also, inserts 48 having a height $H_I$ of between 5 mm and about 7 mm, a width $W_I$ of at least 0.90 times a width $W_T$ of the tube 18 supporting the insert 48, and/or a width $W_I$ of between 0.96 and 1.0 times a width $W_S$ of the sides 20, 22 of the tube 18 supporting the insert 48 have also been found to be highly advantageous. Tubes 18 having a width $W_T$ that is no more than 1.12 times greater than a width $W_S$ of the sides 20, 22 of the tube 18 have also been found to be highly advantageous.

To prove the effectiveness of such a design, the inventors have constructed a number of different heat exchangers such as the heat exchanger 10 described above and have included a number of differently sized and differently configured tubes 18 and inserts 48. The dimensions of the tubes 18 and the inserts 48 of these designs are included in Table 1.

In Example 1, the tube 18 has a tube width $W_T$ of about 95 mm and each of the sides 20, 22 of the tube 18 have a width $W_S$ of 88.25 mm. The insert 48 has a height $H_I$ of 6.5 mm and a width $W_I$ of 88.00 mm. In this embodiment, the heat transfer performance characteristics and fluid flow characteristics of the tube 18 and the insert 48 were found to be highly advantageous for some applications while the cross-sectional area of each of the bypasses 52 and the occurrence of fouling were minimized. Specifically, because the ratio of the tube width $W_T$ to the width $W_S$ of the tube sides 20, 22 is minimized and because the ratio of the insert width $W_I$ to the tube width $W_T$ is maximized, the cross-sectional area of each of the bypasses 52 is minimized without adversely affecting fluid flow through the tube 18 and across the insert 48.

In Example 2, the tube 18 has a tube width $W_T$ of about 85 mm and each of the sides 20, 22 of the tube 18 have a width $W_S$ of 78.25 mm. The insert 48 has a height $H_I$ of 6.5 mm and a width $W_I$ of 77.00 mm. In this embodiment, the heat transfer performance characteristics and fluid flow characteristics of the tube 18 and the insert 48 were also found to be highly advantageous for other applications while the cross-sectional area of each of the bypasses 52 and the occurrence of fouling were minimized. Again, because the ratio of the tube width $W_T$ to the width $W_S$ of the tube sides 20, 22 is minimized and because the ratio of the insert width $W_I$ to the tube width $W_T$ is maximized, the cross-sectional area of each of the bypasses 52 is minimized without adversely affecting fluid flow through the tube 18 and across the insert 48.

In Example 3, the tube 18 has a tube width $W_T$ of about 75 mm and each of the sides 20, 22 of the tube 18 have a width $W_S$ of 68.25 mm. The insert 48 has a height $H_I$ of 6.5 mm and a width $W_I$ of 66.00 mm. In Example 4, the tube 18 has a tube width $W_T$ of about 65.00 mm and each of the sides 20, 22 of the tube 18 have a width $W_S$ of 58.25 mm. The insert 48 has a height $H_I$ of 6.5 mm and a width $W_I$ of 56.00 mm. In these embodiments, the heat transfer performance characteristics and fluid flow characteristics of the tubes 18 and the inserts 48 were also found to be highly advantageous while the cross-sectional area of each of the bypasses 52 and the occurrence of fouling were minimized.

The tube 18 of example 5 which, has a tube width $W_T$ of about 44.20 mm and has sides 20, 22 18 having a width $W_S$ of 37.45 mm, and the insert 48 of example 5, which has a height $H_I$ of 6.5 mm and a width $W_I$ of 35.18 mm, also demonstrated favorable performance characteristics and fluid flow characteristics.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

TABLE 1

|  | $H_I$ (mm) | $W_I$ (mm) | $W_T$ (mm) | $W_S$ (mm) | $W_I/W_T$ | $W_T/W_S$ | $W_I/H_I$ | $W_T/H_I$ | $W_I/W_S$ |
|---|---|---|---|---|---|---|---|---|---|
| Example 1 | 6.50 | 88.00 | 95.00 | 88.25 | 0.93 | 1.08 | 13.54 | 14.62 | 1.00 |
| Example 2 | 6.50 | 77.00 | 85.00 | 78.25 | 0.91 | 1.09 | 11.85 | 13.08 | 0.98 |
| Example 3 | 6.50 | 66.00 | 75.00 | 68.25 | 0.88 | 1.10 | 10.15 | 11.54 | 0.97 |
| Example 4 | 6.50 | 56.00 | 65.00 | 58.25 | 0.86 | 1.12 | 8.62 | 10.00 | 0.96 |
| Example 5 | 6.50 | 35.18 | 44.20 | 37.45 | 0.80 | 1.18 | 5.41 | 6.80 | 0.94 |

What is claimed is:

1. An exhaust gas recirculation cooler for transferring heat from engine exhaust to coolant, the exhaust gas recirculation cooler comprising:
   a pair of spaced apart headers;
   a tube body extending between the pair of headers and positioned along a flow path for the coolant and at least partially defining a flow path for the engine exhaust along a length of the tube between the pair of headers; and a corrugated insert supported in an interior of the tube and having a height in a direction of a plurality of corrugations and a width between about 8.6 and about 13.5 times the height, the width being substantially perpendicular to the length of the tube and being substantially perpendicular to the height of the insert.

2. The exhaust gas recirculation cooler of claim 1, wherein the tube includes a pair of spaced apart walls, and wherein the width of the insert is between about 0.96 and about 1.0 times a width of one of the walls.

3. The exhaust gas recirculation cooler of claim 1, wherein the tube includes a pair of spaced apart arcuate ends and a pair of side walls extending between the pair of spaced apart ends, and wherein a width the pair of side walls is greater than or equal to the width of the insert such that the insert stops short of the pair of arcuate ends of the tube.

4. The exhaust gas recirculation cooler of claim 1, wherein the tube includes a pair of spaced apart arcuate ends and a pair of side walls extending between the pair of arcuate ends, and wherein a width of the tube between the arcuate ends is no more than 1.12 times greater than a width of one of the pair of side walls.

5. The exhaust gas recirculation cooler of claim 4, wherein the height of the insert is no greater than 7 mm and no less than 5 mm.

6. The exhaust gas recirculation cooler of claim 1, wherein the tube includes a pair of spaced apart arcuate ends and a pair of side walls extending between the pair of arcuate ends, and wherein the width of the insert is at least 0.90 times a width of the tube between the arcuate ends.

7. An exhaust gas recirculation cooler for transferring heat from engine exhaust to coolant, the exhaust gas recirculation cooler comprising:
a pair of spaced apart headers;
a tube body extending between the pair of headers and positioned along a flow path for the coolant and at least partially defining a flow path for the engine exhaust along a length of the tube between the pair of headers, the tube body including a pair of spaced apart arcuate ends and a side wall extending between the pair of arcuate ends and having a width; and
a corrugated insert supported in an interior of the tube and having a width in a direction substantially perpendicular to a plurality of corrugations and substantially perpendicular to the length of the tube, the width of the insert being no less than 0.96 times and no greater than 1.00 times the width of the side wall.

8. The exhaust gas recirculation cooler of claim 7, wherein the insert has a height in the direction of the plurality of corrugations, and wherein the width of the insert is at least 8.6 times the height.

9. The exhaust gas recirculation cooler of claim 7, wherein the insert has a height in the direction of the plurality of corrugations, and wherein the width of the insert is less than 13.5 times the height.

10. The exhaust gas recirculation cooler of claim 7, wherein the insert stops short of the pair of arcuate ends of the tube.

11. The exhaust gas recirculation cooler of claim 7, wherein a width of the tube between the arcuate ends is no more than 1.12 times greater than a width of the side wall.

12. The exhaust gas recirculation cooler of claim 7, wherein the height of the insert is no greater than 7 mm and no less than 5 mm.

13. An exhaust gas recirculation cooler for transferring heat from engine exhaust to coolant, the exhaust gas recirculation cooler comprising:
a pair of spaced apart headers;
a tube body extending between the pair of headers and positioned along a flow path for the coolant and at least partially defining a flow path for the engine exhaust along a length of the tube between the pair of headers, the tube body including a pair of parallel side walls and a pair of spaced apart arcuate ends extending between the pair of spaced apart side walls, a width between the arcuate ends being no more than 1.12 times a width of one of the pair of spaced apart side walls; and
a corrugated insert supported in an interior of the tube and having opposite ends stopping short of the arcuate ends of the tube.

14. The exhaust gas recirculation cooler of claim 13, wherein the insert has a height in a direction of a plurality of corrugations, and wherein a width of the insert in a direction substantially perpendicular to both the length of the tube and the height of the insert is at least about 8.6 times the height.

15. The exhaust gas recirculation cooler of claim 14, wherein the width of the insert is less than about 13.5 times the height.

16. The exhaust gas recirculation cooler of claim 13, wherein a width of the insert is between 0.96 and 1.0 times the width of the one of the pair of walls of the tube, the width of the insert being substantially perpendicular to the length of the tube and being substantially perpendicular to the height of the insert.

17. The exhaust gas recirculation cooler of claim 13, wherein the insert has a height in a direction of a plurality of corrugations, and wherein the height of the insert is no greater than 7 mm.

18. The exhaust gas recirculation cooler of claim 13, wherein the insert has a height in a direction of a plurality of corrugations, and wherein the height of the insert is no less than 5 mm.

19. The exhaust gas recirculation cooler of claim 13, wherein the tube includes a pair of spaced apart walls, and wherein a width between the pair of side walls of the tube is at least eight times the height of the insert.

20. An exhaust gas recirculation cooler for transferring heat from engine exhaust to coolant, the exhaust gas recirculation cooler comprising:
a pair of spaced apart headers;
a tube body extending between the pair of headers and positioned along a flow path for the coolant and at least partially defining a flow path for the engine exhaust along a length of the tube between the pair of headers, the tube body including a pair of parallel side walls and a pair of spaced apart arcuate ends extending between the pair of spaced apart side walls; and
a corrugated insert supported in an interior of the tube and having a width in a direction substantially perpendicular to a plurality of corrugations and substantially perpendicular to the length of the tube, the width of the insert being no less than 0.90 times a width of the tube between the pair of arcuate ends.

21. The exhaust gas recirculation cooler of claim 20, wherein the insert has a height in the direction of the plurality of corrugations and, wherein the width of the insert is between about 8.6 and 13.5 times the height of the tube.

22. The exhaust gas recirculation cooler of claim 21, wherein the width of the insert is between at least 0.96 times a width of one of the pair of side walls.

23. The exhaust gas recirculation cooler of claim 22, wherein the width of the insert is between no more than 1.0 times the width of one of the pair of side walls.

24. The exhaust gas recirculation cooler of claim 21, the width of the tube between the arcuate ends is no more than 1.12 times greater than a width of one of the pair of side walls.

25. The exhaust gas recirculation cooler of claim 21, wherein the height of the insert is no greater than 7 mm and no less than 5 mm.

* * * * *

UNITED STATES PATENT AND TRADEMARK OFFICE
CERTIFICATE OF CORRECTION

PATENT NO. : 8,671,921 B2
APPLICATION NO. : 12/668120
DATED : March 18, 2014
INVENTOR(S) : Meshenky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1053 days.

Signed and Sealed this

Twenty-ninth Day of September, 2015

Michelle K. Lee
*Director of the United States Patent and Trademark Office*